US012707102B2

(12) United States Patent
Li et al.

(10) Patent No.: US 12,707,102 B2
(45) Date of Patent: Aug. 11, 2026

(54) INFORMATION DISPLAY METHOD AND APPARATUS, ELECTRONIC DEVICE, AND COMPUTER READABLE MEDIUM

(71) Applicant: Beijing Zitiao Network Technology Co., Ltd., Beijing (CN)

(72) Inventors: Yijie Li, Beijing (CN); Angxiang Fang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/860,886

(22) PCT Filed: Jul. 7, 2023

(86) PCT No.: PCT/CN2023/106361
§ 371 (c)(1),
(2) Date: Oct. 28, 2024

(87) PCT Pub. No.: WO2024/008184
PCT Pub. Date: Jan. 11, 2024

(65) Prior Publication Data

US 2025/0260847 A1 Aug. 14, 2025

(30) Foreign Application Priority Data

Jul. 7, 2022 (CN) ........................ 202210804305.2

(51) Int. Cl.
*H04N 21/2187* (2011.01)
*H04N 21/431* (2011.01)
*H04N 21/4788* (2011.01)

(52) U.S. Cl.
CPC ..... *H04N 21/2187* (2013.01); *H04N 21/4316* (2013.01); *H04N 21/4788* (2013.01)

(58) Field of Classification Search
CPC .......... H04N 21/2187; H04N 21/4316; H04N 21/4788; H04N 21/431; H04N 21/4312; H04N 21/475

(Continued)

(56) References Cited

U.S. PATENT DOCUMENTS

2009/0013265 A1* 1/2009 Cole ....................... H04L 51/18 715/758
2016/0286244 A1* 9/2016 Chang ................ H04N 21/4788

(Continued)

FOREIGN PATENT DOCUMENTS

CN 104917669 A 9/2015
CN 106126709 A 11/2016

(Continued)

OTHER PUBLICATIONS

China National Intellectual Property Administration, Office Action and Search Report Issued in Application No. 202210804305.2, Mar. 7, 2024, 10 pages.

(Continued)

*Primary Examiner* — Adil Ocak
(74) *Attorney, Agent, or Firm* — Alleman Hall LLP

(57) ABSTRACT

Disclosed in the present application are an information display method and apparatus, an electronic device, and a computer readable medium. An information presentation method, comprising: presenting a live streaming page; the live streaming page comprising an information input region; in response to inputting information to be posted into the information input region, presenting, on the live streaming page, an associated object of information to be matched; wherein, a matching result between the information to be posted and the information to be matched satisfies a preset matching condition.

18 Claims, 11 Drawing Sheets presenting a live streaming page; the live streaming page comprising an information input region — S1 in response to inputting information to be posted into the information input region, presenting, on the live streaming page, an associated object of information to be matched; wherein, a matching result between the information to be posted and the information to be matched satisfies a preset matching condition — S2

(58) Field of Classification Search
USPC .......................................................... 725/116
See application file for complete search history.

(56) References Cited

U.S. PATENT DOCUMENTS

| | | | |
|---|---|---|---|
| 2017/0185581 A1* | 6/2017 | Boja | G06Q 10/40 |
| 2018/0121964 A1* | 5/2018 | Zhang | G06Q 30/0269 |
| 2018/0152764 A1* | 5/2018 | Taylor | G06Q 30/0623 |
| 2020/0334447 A1 | 10/2020 | Liu et al. | |
| 2020/0374590 A1* | 11/2020 | Lu | H04N 21/4788 |
| 2021/0064692 A1* | 3/2021 | Srinivasan | G06F 40/30 |
| 2022/0150594 A1* | 5/2022 | Yao | H04L 51/046 |
| 2023/0276078 A1 | 8/2023 | Li et al. | |

FOREIGN PATENT DOCUMENTS

| | | |
|---|---|---|
| CN | 108347653 A | 7/2018 |
| CN | 109359298 A | 2/2019 |
| CN | 109818847 A | 5/2019 |
| CN | 110286776 A | 9/2019 |
| CN | 110545440 A | 12/2019 |
| CN | 110598098 A | 12/2019 |
| CN | 111046210 A | 4/2020 |
| CN | 112199032 A | 1/2021 |
| CN | 112351300 A | 2/2021 |
| CN | 112532507 A | 3/2021 |
| CN | 112748974 A | 5/2021 |
| CN | 113099253 A | 7/2021 |
| CN | 113342435 A | 9/2021 |
| CN | 113672154 A | 11/2021 |
| CN | 113691853 A | 11/2021 |
| CN | 113792181 A | 12/2021 |
| CN | 114253501 A | 3/2022 |
| CN | 115190366 A | 10/2022 |
| JP | 2017152021 A | 8/2017 |
| JP | 2021129205 A | 9/2021 |
| JP | 2022066944 A | 5/2022 |

OTHER PUBLICATIONS

ISA China National Intellectual Property Administration, Written Opinion Issued in Application No. PCT/CN2023106361, Sep. 25, 2023, WIPO, 15 pages.

Lao, B. et al., "The Old Soldier's New Story," Computer Knowledge and Technology (Experience and Skills), Issue 10, Oct. 5, 2013, 2 pages.

Japan Patent Office, Office Action Issued in Application No. 2024564485, Nov. 25, 2025, 10 pages.

* cited by examiner

INFORMATION DISPLAY METHOD AND APPARATUS, ELECTRONIC DEVICE, AND COMPUTER READABLE MEDIUM

CROSS-REFERENCE TO RELATED APPLICATIONS

The present disclosure is based on and claims the priority to the Chinese Patent Application No. 202210804305.2 entitled "INFORMATION DISPLAY METHOD AND APPARATUS, ELECTRONIC DEVICE, AND COMPUTER READABLE MEDIUM" and filed with the Chinese Intellectual Property Office on Jul. 7, 2022 and the PCT application No. PCT/CN2023/106361. The disclosure of each of these applications is incorporated by reference herein in its entirety.

TECHNICAL FIELD

The present disclosure relates to the technical field of Internet, and in particular, to an information presentation method and apparatus, an electronic device, and a computer readable medium.

BACKGROUND

A live is an information network posting mode which synchronously makes and posts information on site along with occurrence and development of an event and has a bidirectional communication process.

In addition, for a live viewer, the viewer may post some information (e.g., comments, etc.) during the live.

However, due to single information interaction modes applied to the live, and complex information posting operations, poor user experience is caused.

SUMMARY

In order to solve above the technical problem, the present application provides an information presentation method and apparatus, an electronic device and a computer readable medium, which are beneficial to improving user experience.

In order to achieve the above objective, the embodiments of the present application provide the following technical solutions:

An embodiment of the application provides an information presentation method, comprising:

presenting a live streaming page; the live streaming page comprising an information input region;

in response to inputting information to be posted into the information input region, presenting, on the live streaming page, an associated object of information to be matched; wherein, a matching result between the information to be posted and the information to be matched satisfies a preset matching condition.

In a possible implementation, the associated object comprises at least one of a sticker to be used or a resource to be used.

In a possible implementation, the presenting, on the live streaming page, an associated object of information to be matched, comprises:

presenting the associated object of the information to be matched in the information input region.

In a possible implementation, a preset position condition is satisfied between a position of the information to be posted in the information input region and a presentation position of the associated object in the information input region.

In a possible implementation, the information to be posted is located at a first end of the information input region; the associated object is presented at a second end of the information input region.

In a possible implementation, after the presenting, on the live streaming page, an associated object of information to be matched, the method further comprises:

in response to a trigger operation on the associated object, inputting the associated object into the information input region.

In a possible implementation, the associated object comprises at least one candidate content;

the in response to a trigger operation on the associated object, inputting the associated object into the information input region, comprises:

in response to a selection operation triggered on content to be used in the at least one candidate content, inputting the content to be used into the information input region.

In a possible implementation, the live streaming page further comprises an information posting control;

after the inputting the associated object into the information input region, the method further comprises:

in response to a trigger operation on the information posting control, posting the information to be posted and the associated object;

or, after the inputting the associated object into the information input region, the method further comprises:

in response to a trigger operation on the information posting control, posting a composite image; the composite image being composed of the information to be posted and the associated object.

In a possible implementation, the associated object is a resource object;

the method further comprises:

after posting the associated object, presenting the resource object in an information presentation region of the live streaming page, and in response to a trigger operation on the resource object, presenting a resource interface corresponding to the resource object;

or, after posting the associated object, presenting a resource identifier corresponding to the resource object in an information presentation region of the live streaming page, and in response to a trigger operation on the resource identifier, presenting a resource interface corresponding to the resource object.

In a possible implementation, the presenting a resource interface corresponding to the resource object, comprises:

presenting the resource interface corresponding to the resource object on the live streaming page.

In a possible implementation, after the presenting, on the live streaming page, an associated object of information to be matched, the method further comprises:

if a presentation duration of the associated object on the live streaming page reaches a preset duration threshold, canceling presenting the associated object from the live streaming page;

or, in response to a character input operation triggered on the information input region, canceling presenting the associated object from the live streaming page.

In a possible implementation, the information to be matched is associated with at least one candidate content; the associated object is randomly selected from the at least one candidate content, or, the associated object is the at least one candidate content.

In a possible implementation, the information to be matched and the associated object of the information to be matched are determined according to live associated information of the live streaming page.

In a possible implementation, the information input region is a comment input box.

An embodiment of the present application further provides an information presentation apparatus, comprising:

a first presentation unit configured to present a live streaming page; the live streaming page comprising an information input region;

a second presentation unit configured to, in response to inputting information to be posted into the information input region, present, on the live streaming page, an associated object of information to be matched; wherein, a matching result between the information to be posted and the information to be matched satisfies a preset matching condition.

An embodiment of the present application further provides an electronic device, comprising: a processor and a memory;

the memory configured to store instructions or a computer program;

the processor configured to execute the instructions or computer program in the memory, so that the electronic device performs any implementation of the information presentation method according to the embodiment of the present application.

An embodiment of the present application further provides a computer readable medium having instructions or a computer program stored therein, which when run on a device, causes the device to perform any implementation of the information presentation method according to the embodiment of the present application.

An embodiment of the present application further provides a computer program product, comprising a computer program carried on a non-transitory computer readable medium, the computer program comprising program code for performing any implementation of the information presentation method according to the embodiment of the present application.

Compared with the prior art, the embodiments of the application at least have the following advantages:

In the technical solutions according to the embodiments of the present application, for an electronic device of a target user, the electronic device may present a live streaming page to the target user, and after the target user inputs information to be posted into an information input region in the live streaming page, if a matching result between the information to be posted and preset information to be matched satisfies a preset matching condition, an associated object of the information to be matched is presented on the live streaming page, so that the target user can directly see the associated object from the live streaming page, therefore, the interactive operation can be effectively simplified, so that the target user can directly see the associated object from the live streaming page with as few operations as possible, and thus the operation complexity of the target user for acquiring the associated object can be effectively reduced, and the acquisition efficiency of the target user for the associated object can be further effectively improved, and the user experience is thus improved.

BRIEF DESCRIPTION OF THE DRAWINGS

In order to more clearly illustrate the embodiments of the present application or the technical solutions in the prior art, the drawings used in the description of the embodiments or the prior art will be briefly described below; it is obvious that the drawings in the following description are only some embodiments described in the present application, and other drawings can be obtained by those skilled in the art without creative efforts.

DETAILED DESCRIPTION

Figure 1:
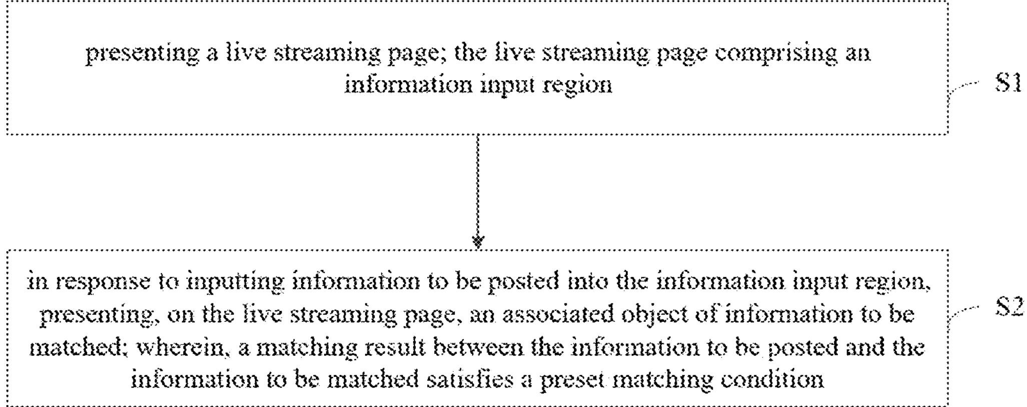
FIG. 1 is a flowchart of an information presentation method according to an embodiment of the present application.

The inventor found in researches on information posting schemes applied to a live that, when a user is watching a live, the user can generally post text comment content through a comment input box on the live page; however, if the user wants to post some other information (e.g., sticker images, etc.) than text comments, the user needs to perform one or more operations (e.g., click a sticker control on the live page, etc.), to open a corresponding information input panel (e.g., sticker selection panel, etc.); then, the user can perform corresponding input operations (for example, a sticker selection operation in the sticker selection panel and the like) on the information input panel, for the purpose of posting other information than the text comments on the live page.

It follows that, in the above information posting scheme, the user needs to perform many operations to acquire other information than the text comments, so that the operation of acquiring the information is relatively complicated, and the user needs to spend much time in acquiring the information, resulting in relatively poor experience of the user in acquiring the information.

Based on the above findings, in order to solve the technical problem shown in the BACKGROUND, an embodiment of the present application provides an information presentation method, in which some candidate matching information and associated content corresponding to the candidate matching information may be preset in advance, so that after a target user inputs information to be posted into an information input region of a live streaming page, if it is determined that a matching result between the information to be posted and the information to be matched in the candidate matching information satisfies a preset matching condition, an associated object (e.g., a sticker image) of the information to be matched is presented on the live streaming page, so that the target user can directly see the associated object from the live streaming page, thereby effectively simplifying an interactive operation, and enabling the target user to directly see the associated object from the live streaming page with as few operations as possible, therefore, the operation complexity of the target user for acquiring the associated object can be effectively reduced, and the acquisition efficiency of the target user for the associated object can be effectively improved, and the user experience (especially, the experience of acquiring and posting other information than characters) is improved.

In addition, the embodiment of the present application does not limit an execution subject of the information presentation method, for example, the information presentation method according to the embodiment of the present application may be performed by an electronic device, which includes but is not limited to a smart phone, a tablet computer, a notebook computer, a Personal Digital Assistant (PDA), and the like.

In order to make those skilled in the art better understand the technical solutions of the present application, the technical solutions in the embodiments of the present application will be clearly and completely described below with reference to the drawings in the embodiments of the present application, and it is obvious that the described embodiments are only a part of the embodiments of the present application, and not all of the embodiments. All other embodiments, which can be obtained by a person skilled in the art without making any creative effort based on the embodiments in the present application, fall within the scope of protection of the present application.

In order to better understand the technical solutions provided by the present application, the information presentation method according to the embodiment of the present application will be described first below in conjunction with some drawings.

As shown in FIG. 1, the information presentation method according to the embodiment of the present application comprises steps S1-S2:

S1: presenting a live streaming page; the live streaming page comprising an information input region.

Figure 2:
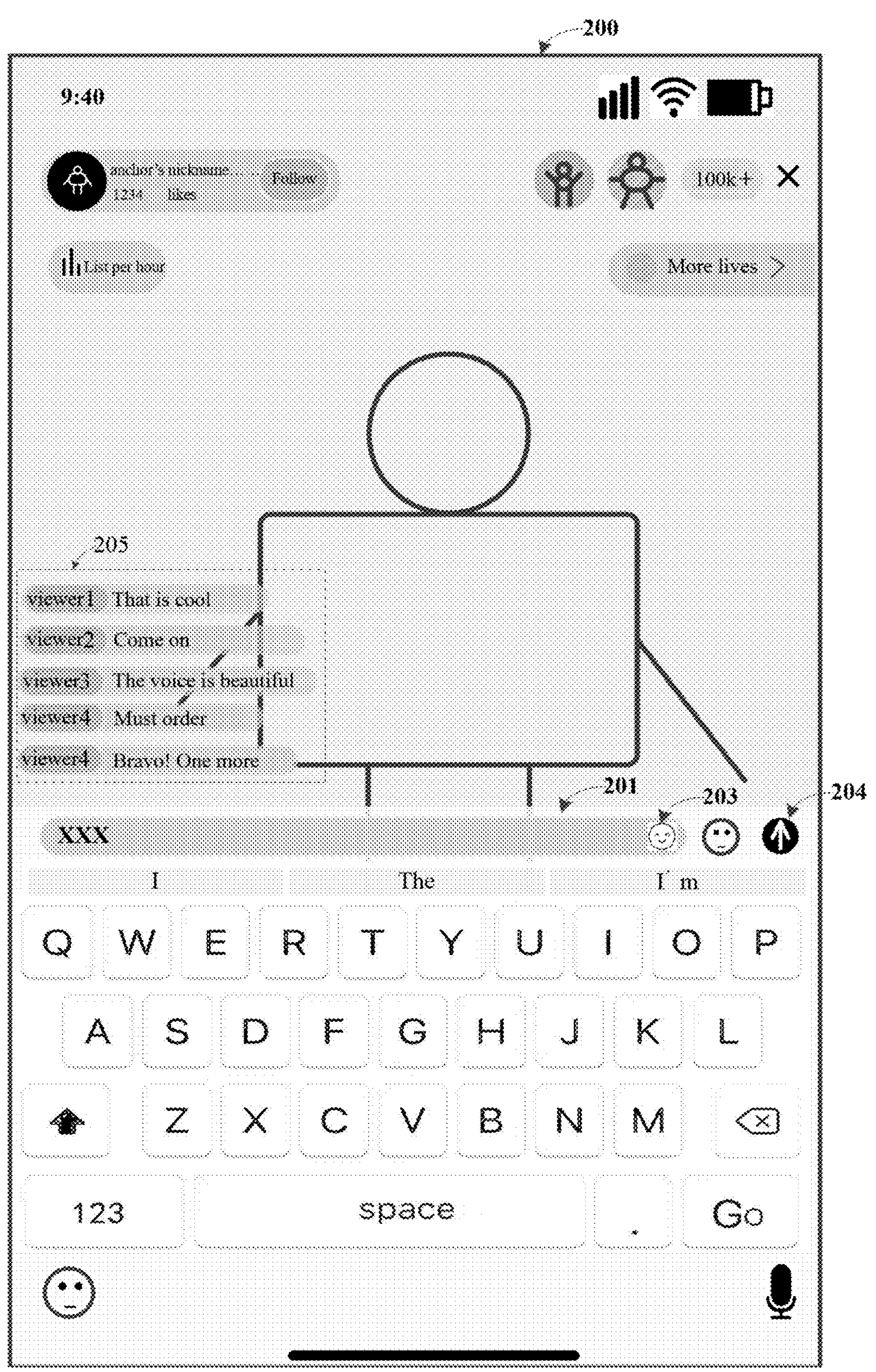
FIG. 2 is a schematic diagram of a live streaming page according to an embodiment of the present application.

The live streaming page is used for displaying a live streaming; and the embodiment of the present application does not limit the live streaming page, and may be, for example, a live streaming page 200 shown in FIG. 2.

In addition, the live streaming page may include at least an information input region. The information input region is used for inputting some information (such as characters, sticker images, recommended cards and the like) which the user wants to post on the live streaming page; also, the embodiment of the present application does not limit the information input region, and for example, it may be a comment input box (for example, a comment input box 201 shown in FIG. 2) for providing a comment input function to the user.

In addition, the information input region provided by the embodiment of the application not only supports the input of characters, but also supports the input of other information (such as characters, sticker images, recommended cards and the like) than the characters. For ease of understanding, the following description is made with reference to examples.

It is assumed that at least one candidate matching information and associated content corresponding to each candidate matching information are preset.

As an example, based on the above assumption, the information input region may have an information input function shown in the following step 11 to step 12:

step 11: in response to a character input operation triggered on the information input region, presenting character information (e.g., "information to be posted" shown below) corresponding to the character input operation in the information input region.

In the embodiment of the present application, for an electronic device of a target user, when the electronic device is presenting a live streaming page (for example, the live streaming operations (for example, clicking some keys on a keyboard shown in FIG. 2 and the like) on the information input region presented on the live streaming page, so that character information (for example, a character string of "XXX" shown in FIG. 2) corresponding to the character input operations is presented in the information input region (for example, the comment input box 201 shown in FIG. 2), and thus a purpose of inputting characters into the information input region can be achieved. It should be noted that the character string "XXX" shown in FIG. 2 is used to describe a sticker.

It should be noted that the target user may be a user watching a live.

Step 12: if it is determined that, a matching result between the character information presented in the information input region and target information in at least one candidate matching information satisfies a preset matching condition, presenting an associated object of the target information on the live streaming page.

The target information is candidate matching information that matches the above "the character information presented in the information input region".

In addition, related content of the step 12 is similar to that of S2 below, please refer to the related content of S2 below to understand the step 12, and for brevity, the related content of step 12 will not be detailed here.

Based on the above related content of the step 12, for the electronic device of the target user, after the electronic device acquires the character information that has been input in the information input region, the electronic device can match the character information with each preset candidate matching information, so that when it is determined that a matching result between the target information in the candidate matching information and the character information satisfies a preset matching condition, the character information can be determined to match the target information, so that the associated object of the target information can be presented on the live streaming page, such that the target user can see not only the character information on the live streaming page, but also one or more objects associated with the character information, so that the target user may subsequently choose to use or not use these objects according to his personal needs.

Based on the related content of S1, for the electronic device of the target user, the electronic device may present the live streaming page to the target user, so that the target user may not only view some video content (for example, a live streaming and the like) on the live streaming page, but also post some information (for example, characters, sticker images, recommended cards and the like) in the live streaming page by means of the information input region in the live streaming page.

S2: in response to inputting information to be posted into the information input region, presenting, on the live streaming page, an associated object of information to be matched; wherein, a matching result between the information to be posted and the information to be matched satisfies a preset matching condition.

The information to be posted refers to character information (for example, a character string of "XXX" shown in FIG. 2) that has been input in the information input region.

The information to be matched refers to candidate matching information matched with the information to be posted in the above "at least one candidate matching information"; and a matching result between the information to be matched and the information to be posted satisfies a preset matching condition. The matching result is used for representing a matching degree between the information to be matched and the information to be posted; and the embodiment of the present application does not limit the matching result, for example, it may be a character similarity between the information to be matched and the information to be posted, or may be a semantic similarity between the information to be matched and the information to be posted. In addition, the preset matching condition may be preset, for example, specifically, it may be that the character similarity reaches a preset first similarity threshold, or may be that the semantic similarity reaches a preset second similarity threshold.

The candidate matching information refers to preset character content bound with associated content; and the embodiment of the present application does not limit the number of the candidate matching information, for example, it may be N; N is a positive integer.

In addition, the embodiment of the present application does not limit the above "at least one candidate matching information", and for example, it may include: some general character content set for any live streaming page.

Figure 3:
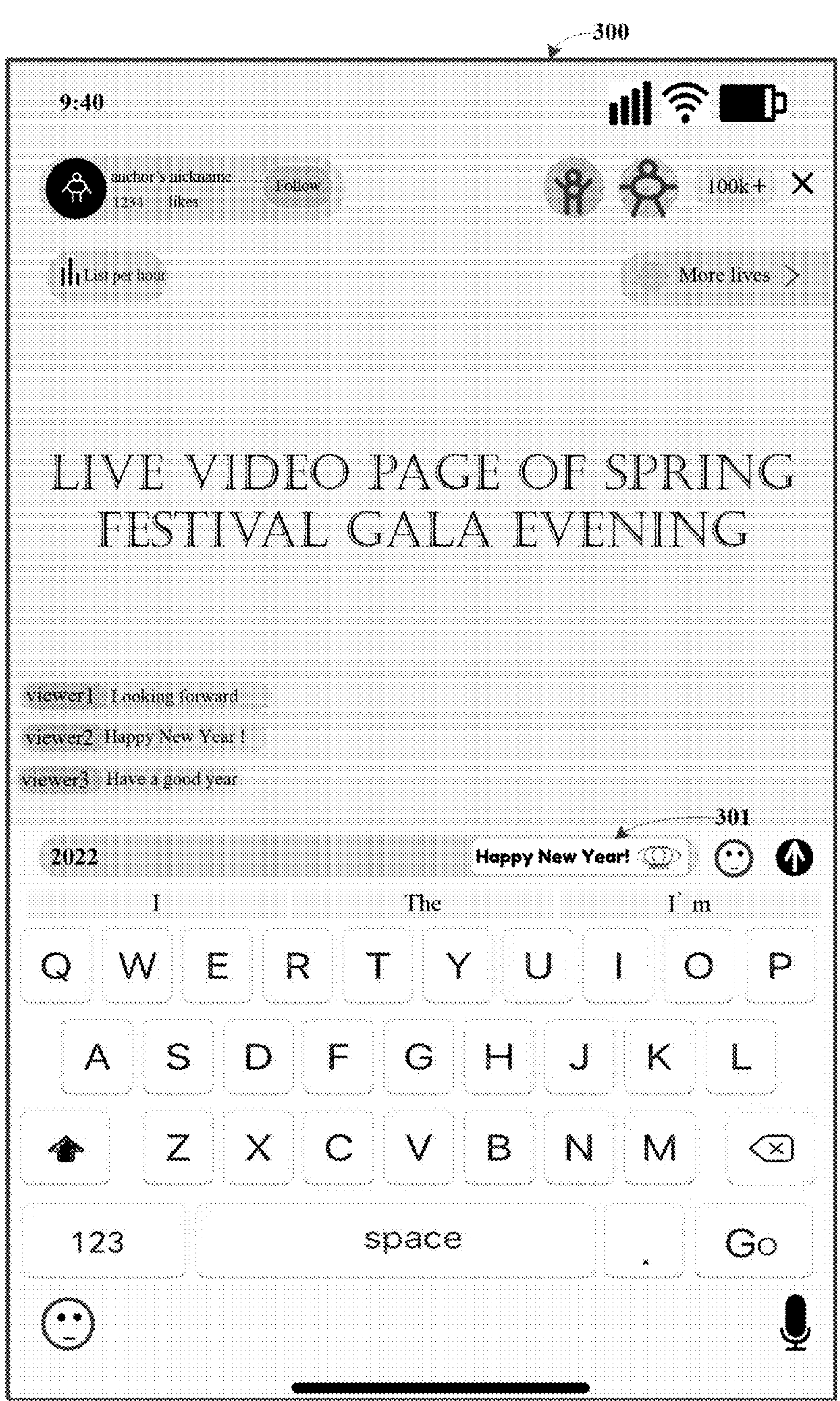
FIG. 3 is a schematic diagram of a live streaming page according to an embodiment of the present application.

In addition, in order to better meet personalized requirements of some target application scenes (for example, scenes such as a live gala evening for a certain festival, a live sporting event, and the like), the "at least one candidate matching information" may include not only some general character content set for any live streaming page, but also some target attention information (for example, a character string "2022" shown in FIG. 3) preset for a live streaming page (for example, a live streaming page 300 for a spring festival gala evening shown in FIG. 3) in these application scenes, so that the target attention information and the associated content (for example, an object 301 shown in FIG. 3) corresponding to the target attention information can meet the personalized requirements of live event operation contents in these application scenes.

As can be seen, in some application scenes, for the nth candidate matching information, the nth candidate matching information may be determined according to live associated information of the live streaming page, so that the nth candidate matching information is associated with some content of the live streaming page. The live associated information can be used to indicate content related to the live streaming picture, live room type (e-commerce, KTV, game), live theme, live event, live content, and the like. It should be noted that the embodiment of the present application does not limit the process of determining the nth candidate matching information, and for example, it may be set manually or may be set automatically by using a preset machine learning model.

The associated content corresponding to the nth candidate matching information refers to at least one preset object (for example, sticker image, recommended card, colored egg, resource, and the like) having an association with the nth candidate matching information, so that when it is determined that the character information presented in the above information input region matches the nth candidate matching information in the future, the associated content corresponding to the nth candidate matching information is directly presented at a preset position (for example, a right edge region shown in FIG. 2) of the information input region, wherein n is a positive integer, n≤N, N is a positive integer, and N represents the number of candidate matching information.

Figure 4:
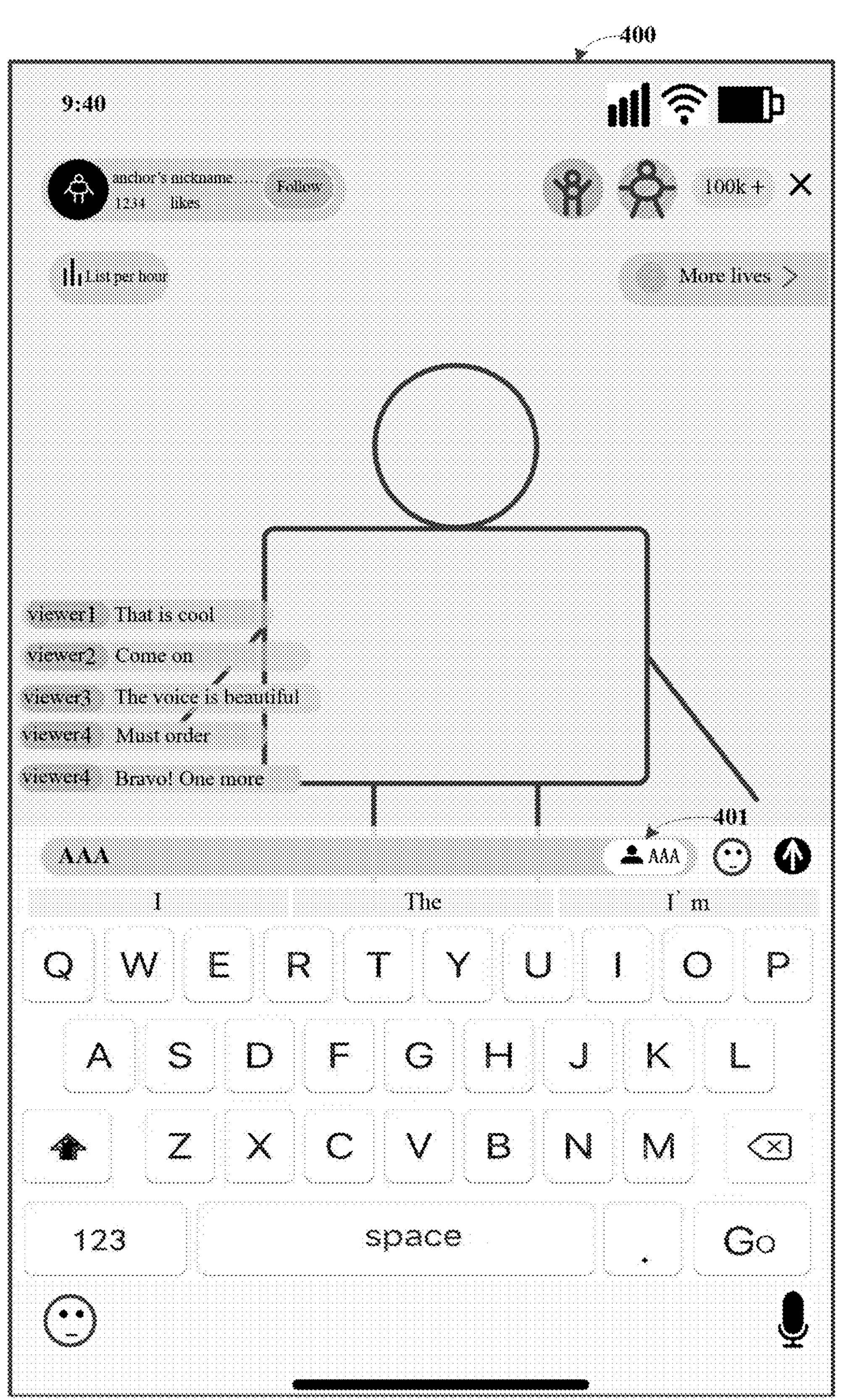
FIG. 4 is a schematic diagram of a live streaming page according to an embodiment of the present application.

In addition, the embodiment of the present application does not limit the associated content corresponding to the nth candidate matching information, for example, at least one associated content may be included. Wherein, the "at least one associated content" may comprise one or more of at least one sticker image or at least one resource. The resource may include at least one of a colored egg resource, a commodity resource, or a multimedia resource, and the resource may be presented by using at least one of an icon, a link, an image, and a card (for example, the card 401 shown in FIG. 4).

The sticker image is used for displaying a sticker; and the embodiment of the present application does not limit an implementation of the sticker image, and it may be a still image or a moving image, for example.

The colored egg resource is used for deepening live watching interests of the user; and the embodiment of the application does not limit the colored egg resource, and for example, it may be set according to personalized requirements of the live room.

The commodity resource refers to commodities which can be purchased by a viewer in a live room; and the embodiment of the application does not limit the commodity resource, and for example, it may be set according to personalized requirements of the live room.

The multimedia resource refers to multimedia data (e.g., songs, videos, etc.) that can be shared for use in a live room.

Figure 5:
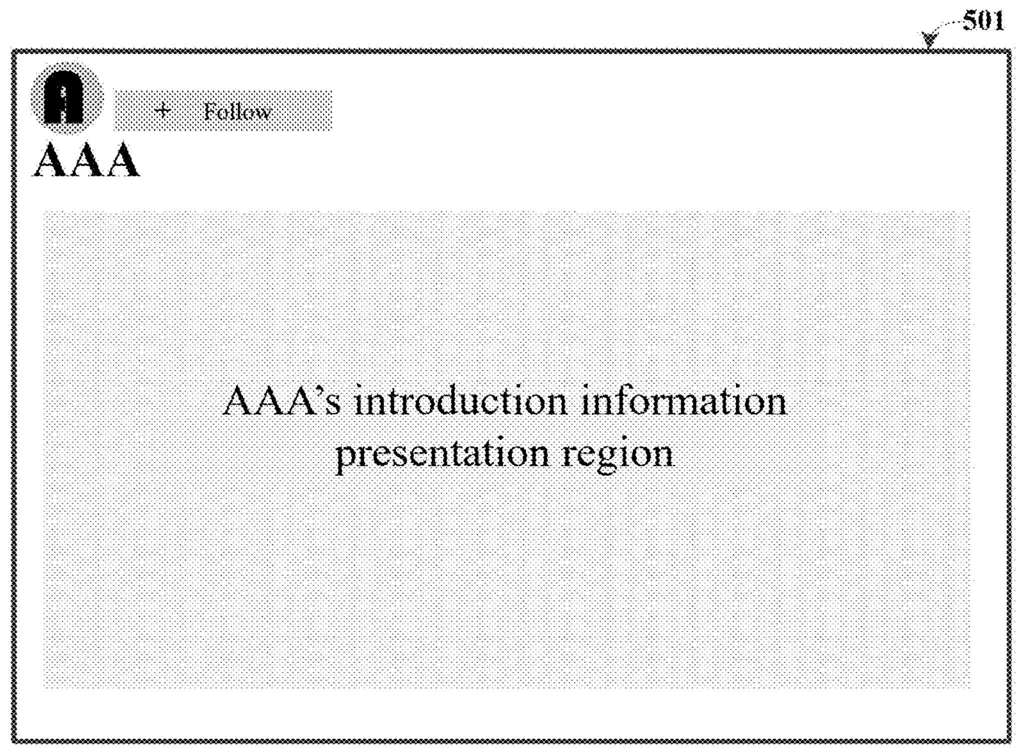
FIG. 5 is a schematic diagram of an information detail page corresponding to a card according to an embodiment of the present application.

The card is used for presenting related content (such as introduction, follow control, object identifier and the like) of a certain object (such as a certain commodity, a certain discount, a certain object and a certain scenic spot); and after a preset operation (e.g., a click operation) is triggered on the card, an information presentation page (e.g., a page 501 shown in FIG. 5) corresponding to the card may be presented.

Figure 6:
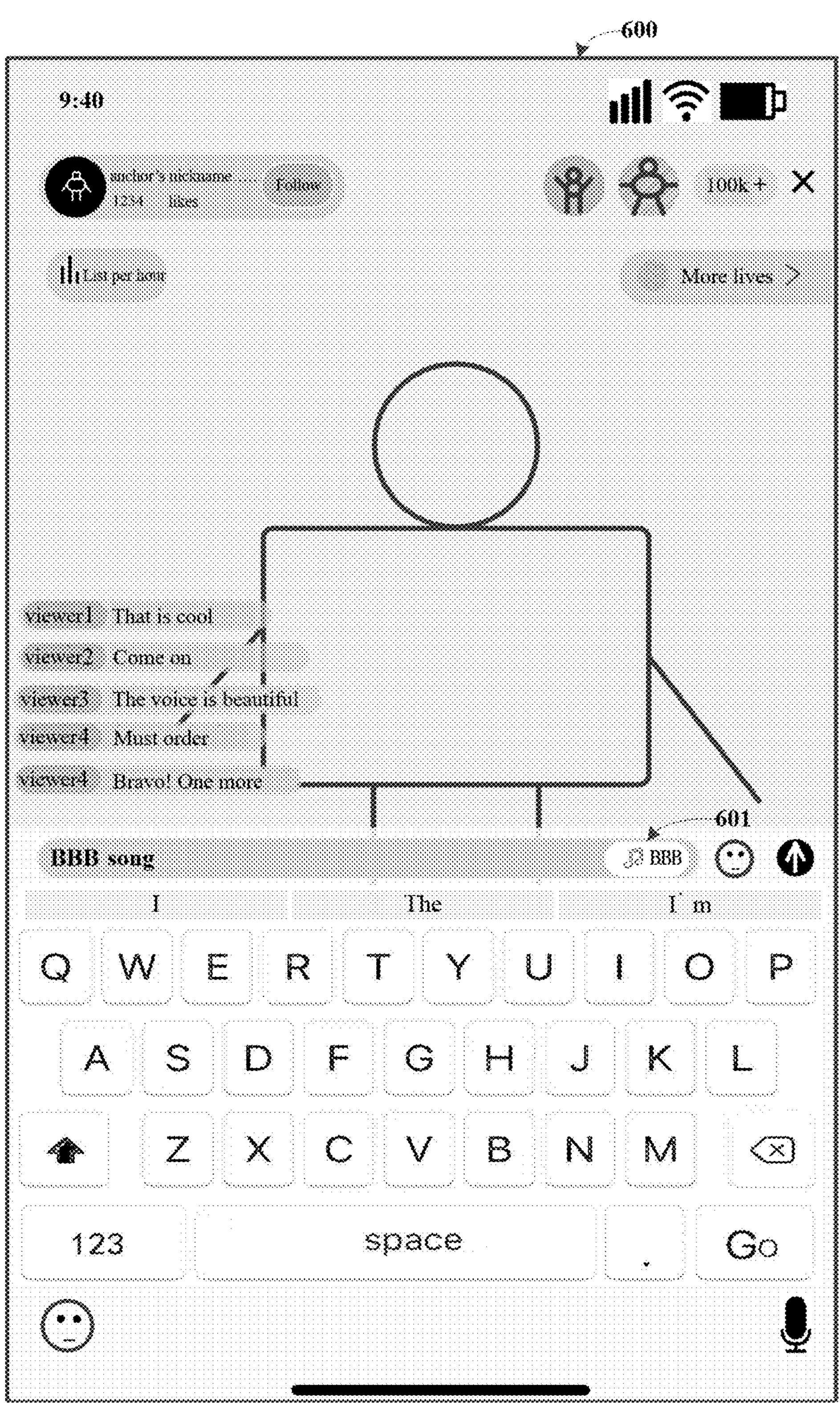
FIG. 6 is a schematic diagram of a live streaming page according to an embodiment of the present application.

A link refers to a trigger link (e.g., a song link 601 shown in FIG. 6) of some resource data that a target user can use (or post) with the electronic device; and the embodiment of the present application does not limit the resource data, and for example, it may be audio data, video data, image data, file information, text data, etc. stored in a preset storage space. As another example, it may be audio data, video data, image data, file information, text data, or the like downloaded from a network.

In addition, the embodiment of the present application does not limit the setting mode of the associated content corresponding to the nth candidate matching information, and for example, it may specifically be: specifying, by an associated person, at least one associated content associated with the nth candidate matching information, for the nth candidate matching information. As another example, it may also be: configuring the associated content corresponding to the nth candidate matching information for the nth candidate matching information, according to the live associated information of the live streaming page, so as to enable the associated content corresponding to the nth candidate matching information to be associated with some content of the live streaming page.

The above “associated object of information to be matched” is used to indicate one or more preset associated content associated with the information to be matched; and the embodiment of the present application does not limit the “associated object of information to be matched”, and for example, it may include at least one of a sticker to be used or a resource to be used. The sticker to be used refers to a preset sticker image associated with the information to be matched. The resource to be used refers to a preset resource related to the information to be matched; the resource to be used comprises at least one of a colored egg resource, a commodity resource or a multimedia resource; and the resource to be used is presented by means of at least one of icon, link, image and card.

In addition, based on content related to the above “nth candidate matching information” and the “associated content corresponding to the nth candidate matching information”, in some cases, the information to be matched and the associated object of the information to be matched may be determined according to the live associated information of the live streaming page. For example, in some embodiments, the associated object of the information to be matched may be generated based on video frames of the live streaming according to the information to be posted, for example, the associated object is composed of a sticker and text inputted by the user and complete or partial images of the video frames of the live streaming, or is composed of images inputted by the user and associated with the live streaming.

In addition, the embodiment of the present application does not limit the determination of the above “associated object of information to be matched”, for example, when the above “at least one candidate matching information and associated content corresponding to the candidate matching information” indicates that the information to be matched is associated with only one candidate content, the determination of the “associated object of information to be matched” may specifically be: directly determining the candidate content as the associated object of the information to be matched.

For another example, when the above “at least one candidate matching information and associated content corresponding to the candidate matching information” indicates that the information to be matched is associated with multiple candidate contents, the determining of the “associated object of the information to be matched” may specifically be: randomly selecting one candidate content from the candidate contents, and determining the candidate content as the associated object of the information to be matched, so that only the selected candidate content can be subsequently displayed in the live streaming page, thereby effectively reducing the occupied position of the associated object of the information to be matched in the live streaming page.

For example, in order to further improve the flexibility of information selection, an embodiment of the present application further provides another possible implementation of the determination of the above “associated object of information to be matched”, in which, when the above “at least one candidate matching information and associated content corresponding to the candidate matching information” indicates that the information to be matched is associated with multiple candidate contents, the determination of the “associated object of e information to be matched” may specifically be: determining all the candidate contents as the associated object of the information to be matched, so that a viewer of the live streaming page can select one candidate content which the viewer wants to use from the candidate contents according to personal needs of the viewer, after all the candidate contents are subsequently presented on the live streaming page.

It should be noted that, the embodiment of the present application does not limit the presentation of the candidate contents on the live streaming page, for example, the candidate contents may be directly arranged on the live streaming page according to a preset sequence. As another example, to save page space, these candidate contents are presented in turn on the live streaming page. Also for example, to save page space, the candidate contents may be scaled down for presentation on the live streaming page. Also, to save page space, one of the candidate contents and a preset marker (e.g., . . . , ▼) may be presented on the live streaming page, so that when the target user subsequently clicks on the presentation region of the candidate content, a list for recording the candidate contents is presented on the live streaming page for selection by the target user.

In addition, the embodiment of the present application does not limit the presentation of the above “associated object of information to be matched”, for example, in order to facilitate a user to better see the associated object of the information to be matched, the presentation of the “associated object of information to be matched” may specifically be: presenting the associated object of the information to be matched in the information input region, so that the target user can see not only the information to be posted which has been inputted by him in the information input region, but also associated content having an association with the information to be posted.

The embodiment of the present application does not limit the presentation position of the above “associated object of information to be matched” in the information input region, for example, a preset position condition is satisfied between the presentation position of the associated object of the information to be matched in the information input region and a position of the information to be posted in the information input region. The preset position condition may be preset, for example, in order to avoid the presentation of the associated object from interfering with character input as much as possible, the preset position condition may specifically be: a distance between the presentation position of the associated object of the information to be matched in the information input region and the position of the information to be posted in the information input region being as maximum as possible. For ease of understanding, the following description is made with reference to examples.

As an example, as shown in FIG. 2, when the above “information input region” is the comment input box 201 shown in FIG. 2, the above “information to be posted” is a character string of “XXX” shown in FIG. 2, and the above “associated object of information to be matched” is a sticker image 203 shown in FIG. 2, the information to be posted may be located at a left edge position (i.e., a position where the character string of “XXX” shown in FIG. 2 is located) within the information input region, and the associated object of the information to be matched may be presented at a right edge position (i.e., a position where the sticker image 203 shown in FIG. 2 is located) within the information input region, so that a distance between the information to be posted and the associated object of the information to be matched is maximized, thereby effectively avoiding the interference to the character input in the information input region caused by an improper presentation position of the associated object.

Based on the related content of the above S1 to S2, for the electronic device of the target user, the electronic device may present a live streaming page (e.g., the live streaming page) to the target user, and after the target user inputs information to be posted (e.g., the character string of "XXX" shown in FIG. 2, the character string of "2022" shown in FIG. 3, a character string of "AAA" shown in FIG. 4, or a character string of "BBB song" shown in FIG. 6) into the information input region in the live streaming page, if a matching result between the information to be posted and the preset information to be matched satisfies a preset matching condition, an associated object (e.g., the sticker image 203 shown in FIG. 2, an object 301 shown in FIG. 3, a card 401 shown in FIG. 4, or a song link 601 shown in FIG. 6) of the information to be matched is presented on the live streaming page, so that the target user can directly see the associated object from the live streaming page (for example, the page 200 shown in FIG. 2, a page 300 shown in FIG. 3, a page 400 shown in FIG. 4, or a page 600 shown in FIG. 6), thereby effectively simplifying the interactive operation, such that the target user can directly see the associated object from the live streaming page with as few operations as possible, the operation complexity of the target user in acquiring the associated object can be effectively reduced, and the acquisition efficiency of the target user for the associated object can be effectively improved, and the user experience (especially, the experience for acquiring and posting other information than characters) is improved.

In fact, when presenting the associated object of the information to be matched, the presentation region occupied by the associated object of the information to be matched is limited, and at this time, in order to ensure that the target user can completely see the associated object of the information to be matched from the live streaming page, the embodiment of the present application further provides a possible implementation of presenting the associated object of the information to be matched, which may specifically comprise steps 21 to 24:

step 21: after acquiring the associated object of the information to be matched, determining whether the associated object of the information to be matched satisfies a preset presentation condition; if so, executing the step 22; otherwise, executing the steps 23 to 24.

The preset presentation condition may be preset, for example, it may specifically be: a size of the associated object not exceeding a preset size threshold. As another example, it may specifically be: a size of a storage space occupied by the associated object not exceeding a preset space threshold.

It can be seen that, after the associated object of the information to be matched is acquired, it may be determined firstly whether the associated object satisfies the preset presentation condition; if so, it can be determined that the associated object can be completely displayed on the live streaming page, and therefore the associated object can be directly presented; however, if not, it can be estimated that the associated object may not be displayed on the live streaming page completely, and therefore, in order to improve the presentation effect of the associated object, the associated object may be adjusted so that the adjusted associated object can be displayed on the live streaming page completely.

Step 22: presenting the associated object of the information to be matched on the live streaming page.

In the embodiment of the application, when determining that the associated object of the information to be matched satisfies the preset presentation condition, it can be determined that the associated object can be completely displayed on the live streaming page, so that the associated object can be directly presented, and the target user can completely see the associated object from the live streaming page.

Step 23: adjusting the associated object of the information to be matched according to a preset object adjustment rule to obtain the adjusted associated object.

In the embodiment of the present application, when determining that the associated object of the information to be matched satisfies the preset presentation condition, it can be determined that the associated object may not be completely displayed on the live streaming page, so that the associated object of the information to be matched can be adjusted according to the preset object adjustment rule, the adjusted associated object can satisfy the preset presentation condition, such that the adjusted associated object can be completely displayed on the live streaming page, and the target user can completely see the associated object from the live streaming page.

It should be noted that, the "object adjustment rule" may be preset according to an application scene (for example, manually set or automatically set).

Step 24: displaying the adjusted associated object on the live streaming page.

In the embodiment of the present application, after the associated object of the information to be matched is adjusted, the adjusted associated object can be displayed on the live streaming page, so that the target user can completely see the associated object from the live streaming page.

Based on the related content of the above steps 21 to 24, in some application scenes, after the associated object of the information to be matched is acquired, the associated object of the information to be matched may be adjusted and then presented, so as to ensure that the target user can completely see the associated object from the live streaming page, and facilitate the user to obtain the presentation effect of the associated object, thereby facilitating the user to determine an interested associated object, and improving the user experience.

In addition, for the above adjusted associated object, in order to facilitate the user to better understand an original look of the adjusted associated object, another possible implementation of presenting the associated object of the information to be matched is further provided in the embodiment of the present application, in which, the presentation of the associated object of the information to be matched not only includes the above steps 21 to 24, but also includes step 25:

Step 25: if the adjusted associated object is presented on the live streaming page, in response to a preset operation triggered on the adjusted associated object, the above "associated object of information to be matched" (that is, the associated object before adjustment) is presented in a region above (for example, directly above or obliquely above) the adjusted associated object.

The preset operation may be preset, for example, it may specifically be: the mouse staying on the adjusted associated object for a preset duration. As another example, it may specifically be: long-pressing the adjusted associated object.

Based on the related content of the step 25, in some application scenes, for the live streaming page, the live streaming page may not only present the adjusted associated object, but also present the associated object before adjustment, so that the target user can better know presented details of the associated object from the live streaming page, which is beneficial to improving the user experience.

In addition, in order to further improve the user experience, the target user can not only directly see the associated object of the information to be matched on the live streaming page, but also select whether to input the associated object into the information input region according to his personalized requirements.

Based on this, the embodiment of the present application further provides another possible implementation of the above information presentation method, in which, the information presentation method may further comprise at least one of the following steps S3 to S5, in addition to at least the steps S1 to S2. The execution time of S3, the execution time of S4, and the execution time of S5 are all later than the execution time of the S2.

S3: if a presentation duration of the associated object of the information to be matched on the live streaming page reaches a preset duration threshold, canceling displaying the associated object (or the above "adjusted associated object") from the live streaming page. The preset duration threshold may be preset, and may be 3 seconds, for example.

In the embodiment of the present application, for the electronic device of the target user, when the associated object (or the above "adjusted associated object") of the information to be matched is being presented on the live streaming page, the electronic device may detect in real time whether the target user performs a trigger operation (for example, a click operation) on the associated object, and record a presentation duration of the associated object on the live streaming page, so that when the electronic device determines that the presentation duration of the associated object on the live streaming page reaches the preset duration threshold, and the target user has not performed any operation on the associated object during the presentation, the electronic device may determine that the target user does not want to use the associated object, so the electronic device may delete (that is, cancel displaying) the associated object from the live streaming page, to end the presentation the associated object, thereby effectively avoiding the interference of the associated object to the subsequent information input operation.

S4: in response to a character input operation triggered on the information input region, cancelling displaying the associated object (or, the above "adjusted associated object") of the information to be matched from the live streaming page.

In the embodiment of the present application, for the electronic device of the target user, when the associated object (or, the above "adjusted associated object") of the information to be matched is being presented on the live streaming page, the electronic device can detect in real time whether the target user has triggered a character input operation on the information input region (i.e., whether the target user has inputted a new character into the information input region), so that after the electronic device determines that the target user has triggered a character input function on the information input region, the electronic device can determine approximately that the target user does not want to use the associated object, so the electronic device can delete (i.e., cancel displaying) the associated object from the live streaming page, to end the presentation of the associated object, thereby effectively avoiding the interference of the associated object to the subsequent information input operation.

S5: in response to a trigger operation on the associated object (or, the above "adjusted associated object") of the information to be matched, inputting the associated object into the information input region.

The embodiment of the present application does not limit the "trigger operation" in S5, for example, when only one candidate content exists in the above "associated object of information to be matched", the "trigger operation" may specifically be: an operation of clicking the candidate content. For another example, when the above "associated object of information to be matched" includes multiple candidate contents, the "trigger operation" may specifically be: an operation of selecting a certain candidate content from these candidate contents.

The embodiment of the present application does not limit the implementation of the above S5, for example, when there is only one candidate content in the above "associated object of information to be matched", S5 may specifically be: in response to a trigger operation (e.g., a click operation) on the candidate content, inputting the candidate content into the information input region. For another example, when the above "associated object of information to be matched" includes multiple candidate contents, S5 may specifically be: in response to a selection operation triggered on the content to be used in the candidate contents, inputting the content to be used into the information input region. The content to be used refers to one candidate content selected for use from the candidate contents.

In addition, in order to facilitate better understanding of related content to the input position of the associated object within the information input region, a description will be given below, taking as an example a scenario in which there is only one candidate content in the above "associated object of information to be matched".

As an example, when there is only one candidate content in the above "associated object of information to be matched", the input position of the associated object (that is, the candidate content) in the information input region is adjacent to the position where the information to be posted is located in the information input region. That is, for the information inputted into the information input region, the associated object is immediately adjacent to the information to be posted, so that the existence of the association between the above "associated object of information to be matched" and the above "information to be posted" can be better reflected.

In fact, in order to better reflect a time sequence of information input, the embodiment of the present application provides another possible implementation of the input position of the associated object in the information input region, in which, when only one candidate content exists in the above "associated object of information to be matched", the input position of the associated object (that is, the candidate content) in the information input region is adjacent to the position where the information to be posted is located in the information input region, and the input position of the associated object in the information input region is located behind the position where the information to be posted is located in the information input region. For ease of understanding, the following description is made with reference to examples.

Figure 7:
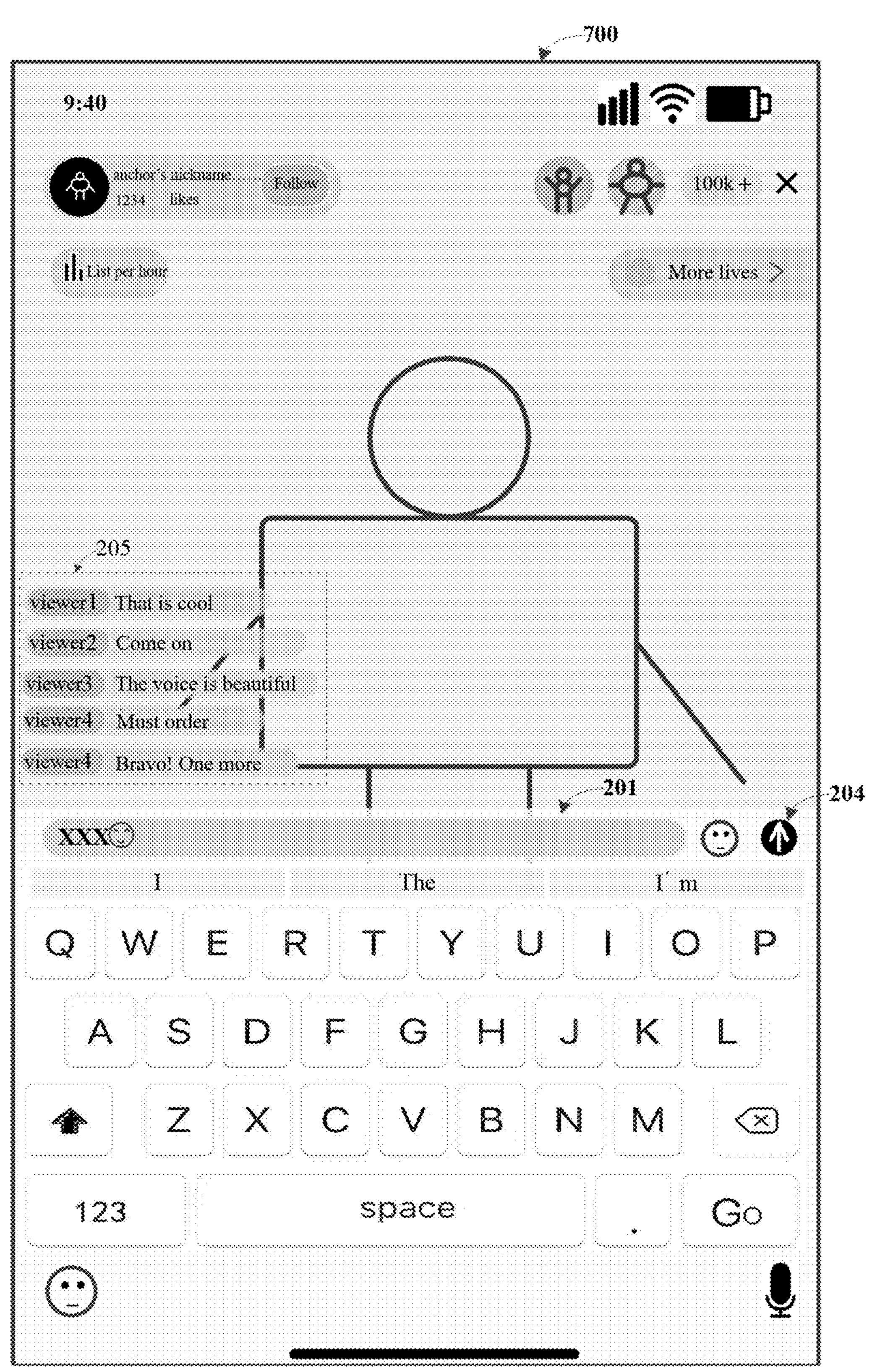
FIG. 7 is a schematic diagram of a live streaming page according to an embodiment of the present application.

As an example, when the live streaming page is the page 200 shown in FIG. 2, the information input region is the comment input box 201 shown in FIG. 2, the information to be posted is a character string of "XXX" shown in FIG. 2, and the associated object is the sticker image 203, S5 may specifically be: in response to a click operation on the sticker image 203, inputting the sticker image 203 into the comment input box 201 to obtain the page 700 shown in FIG. 7. Based on the page 700, the sticker image 203 immediately follows the character string "XXX" in the comment input box 201, so that the viewer of the page 700 not only can know that the sticker image 203 is associated with the character string "XXX", but also can know that the sticker image 203 is inputted later than the character string "XXX".

Based on the related content of S5, for the electronic device of the target user, when the associated object of the information to be matched is being presented on the live streaming page and the associated object includes at least one candidate content, the electronic device may detect whether the target user triggers a selection operation (for example, a click operation) on some candidate content, so that when the electronic device determines that the target user triggers a selection operation on the content to be used in the candidate contents, the electronic device may input the content to be used into the information input region, so that the information input region (such as the comment input box 201 shown in FIG. 7) not only inputs the information to be posted (for example, a character string of "XXX" shown in FIG. 7) but also inputs the associated content associated with the information to be posted (for example, a sticker image behind the character string of "XXX" shown in FIG. 7), therefore, the target user subsequently can post the two parts of information as a whole, thereby improving the user experience of information posting.

In fact, in order to further improve the user experience, the embodiment of the present application provides another possible implementation of the information presentation method, in which when the live streaming page at least includes an information posting control, the information presentation method may further include the following S6 in addition to at least the above S1, S2, and S5. Wherein an execution time of S6 is later than that of S5.

S6: in response to a trigger operation on the information posting control, posting the information to be posted and the associated object of the information to be matched, or posting a composite image composed of the information to be posted and the associated object of the information to be matched.

The information posting control is used for controlling whether to post the information that has been inputted in the information input region; and the embodiment of the present application does not limit the information posting control, and for example, it may be a send button 204 shown in FIG. 7.

In addition, the embodiment of the present application does not limit the implementation of the "trigger operation" in S6, for example, when the information posting control is the send button 204 shown in FIG. 7, the "trigger operation" may specifically be a click operation.

The composite image refers to a composite result of the information to be posted and the associated object of the information to be matched; and the embodiment of the present application does not limit the determination of the composite image, and for example, it may specifically be: composing the information to be posted and the associated object of the information to be matched according to a preset composition rule to obtain the composite image, so that the composite image not only can represent the information carried by the associated object, but also can represent the information carried by the information to be posted. The preset composition rule may be preset.

As can be known from the related content of S6, for the electronic device of the target user, when information to be posted (for example, the character string "XXX" shown in FIG. 7) and the associated object of the information to be matched (for example, the sticker image following the character string "XXX" shown in FIG. 7) have already been inputted in the information input region of the live streaming page (for example, the page 700 shown in FIG. 7) presented by the electronic device, if the electronic device detects that the target user triggers a click operation on the information posting control in the live streaming page, the electronic device may post all the inputted information (for example, the character string "XXX" shown in FIG. 7 and the sticker image following the character string "XXX") in the information input region as a whole, so that the information presentation region (for example, a region 801 shown in FIG. 8) in the live streaming page is presented with the posted information (e.g., the character string "XXX" shown in FIG. 8 and the sticker image following the character string "XXX"), such that any user in the live room can see the posted information.

In fact, in some application scenes, the associated object (e.g., an article, a recommendation card, a resource link, etc.) may be a resource object (e.g., an article, a recommendation card, a song, etc.), so that when the associated object or a resource identifier corresponding to the associated object is triggered, a resource interface (e.g., an article detail page, a jump page, some resource data, etc.) corresponding to the associated object can be presented to the user.

Based on the above requirements, an embodiment of the present application further provides another possible implementation of the information presentation method, in which when the live streaming page at least includes an information presentation region, and the associated object of the information to be matched is a resource object, the information presentation method may further include the following S7 or S8, in addition to at least the above S1, S2, and S5.

S7: after posting the associated object of the information to be matched, presenting a resource object in an information presentation region of the live streaming page, and in response to a trigger operation on the resource object, presenting a resource interface corresponding to the resource object.

S8: after posting the associated object of the information to be matched, presenting a resource identifier corresponding to a resource object in an information presentation region of the live streaming page, and in response to a trigger operation on the resource identifier, presenting a resource interface corresponding to the resource object.

Figure 8:
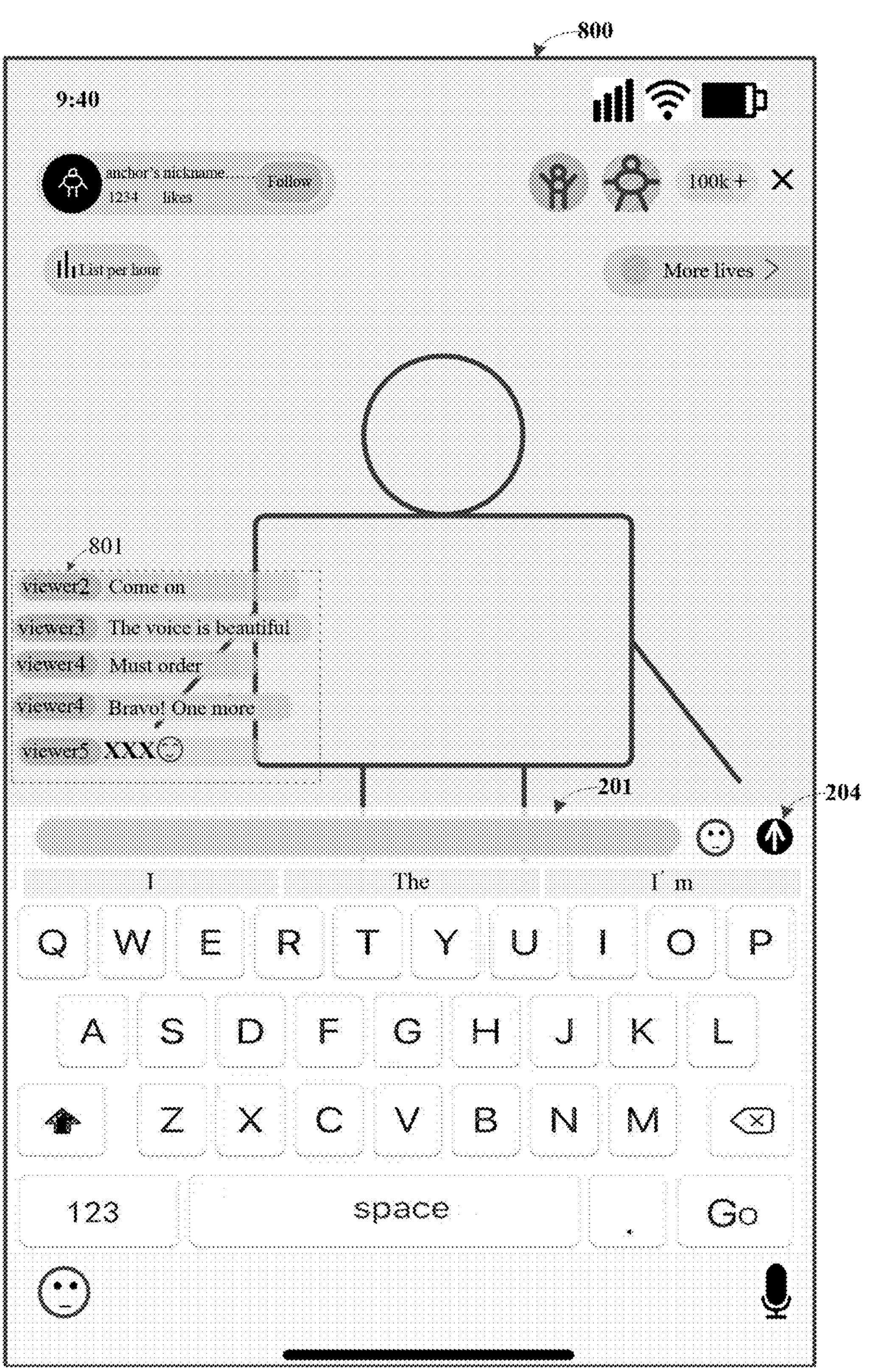
FIG. 8 is a schematic diagram of a live streaming page according to an embodiment of the present application.

The information presentation region is used for presenting information (such as characters, sticker, recommended card) posted by a viewer of the live streaming page for the live streaming page; and the embodiment of the present application does not limit the information presentation region, and for example, it may be a comment presentation region (for example, a common screen 205 shown in FIG. 2 or a common screen 801 shown in FIG. 8).

Figure 9:
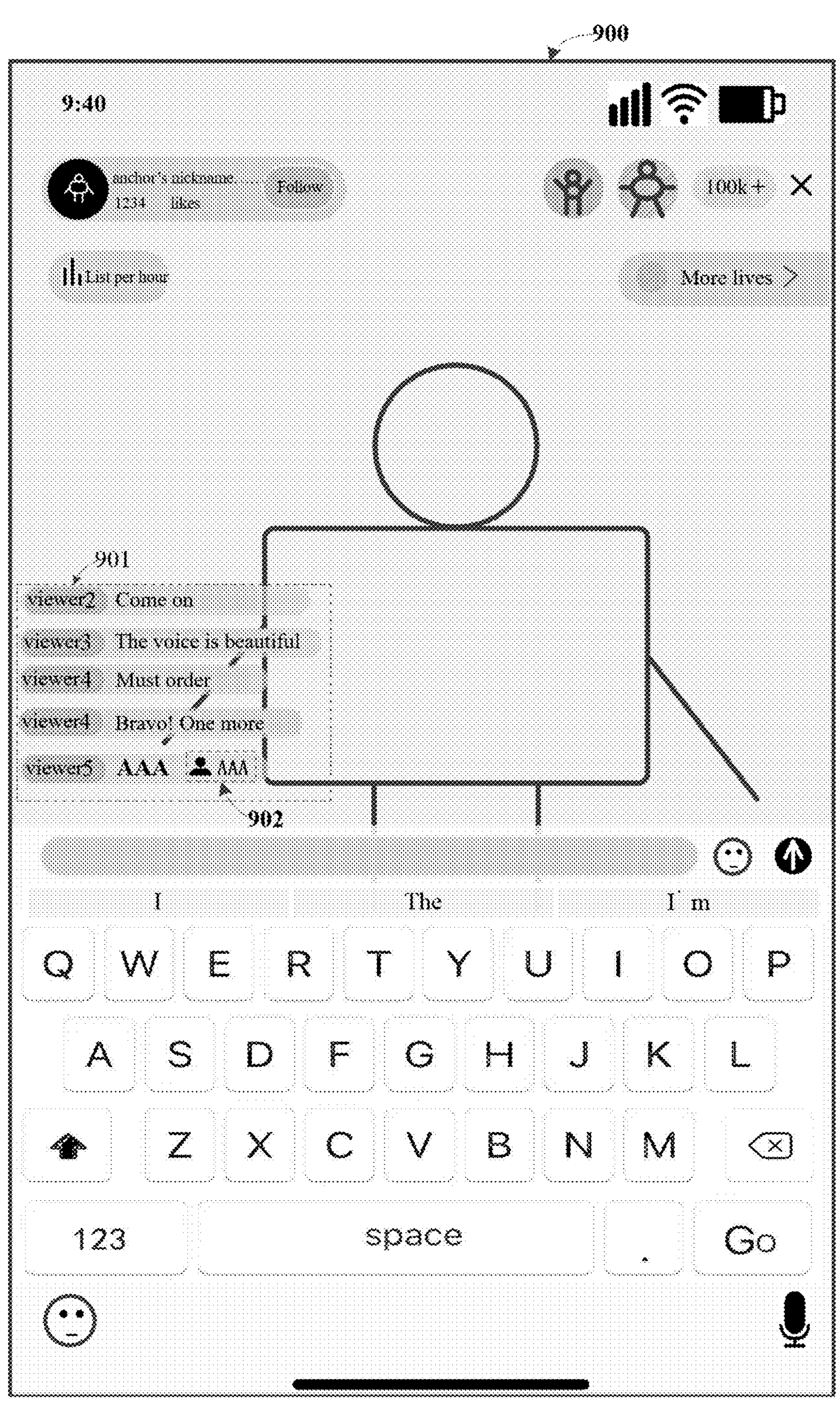
FIG. 9 is a schematic diagram of a live streaming page according to an embodiment of the present application.

In addition, the embodiment of the present application does not limit the above "resource object", for example, it may be a card 902 shown in FIG. 9. As another example, it may be the "resource link" above.

The "resource identifier corresponding to a resource object" is used to identify the resource object; and the embodiment of the present application does not limit the resource identifier corresponding to the resource object.

The embodiment of the present application does not limit the implementation of the "trigger operation" in S7 or S8, and it may be, for example, a click operation.

Figure 10:
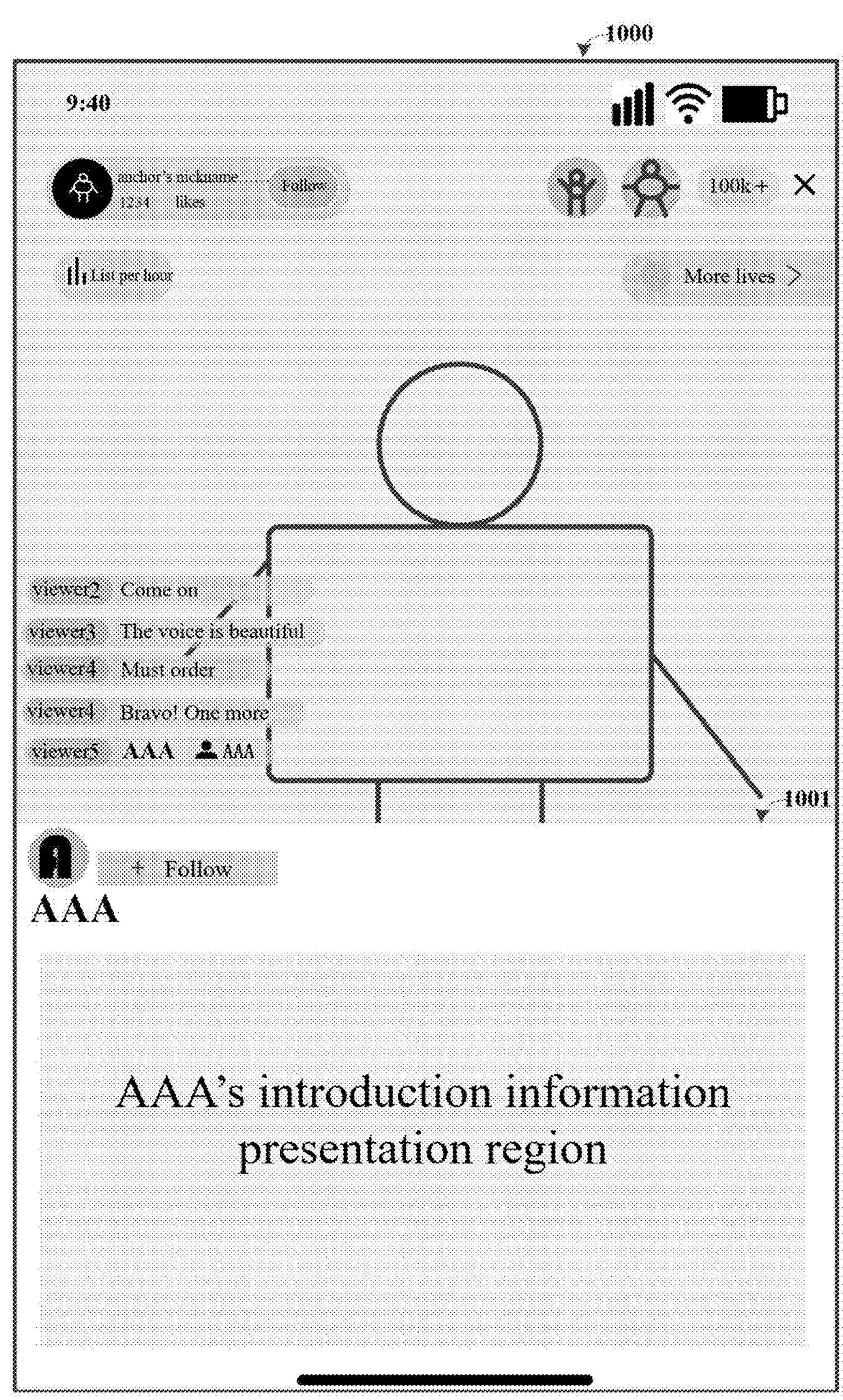
FIG. 10 is a schematic diagram of a live streaming page according to an embodiment of the present application.

The embodiment of the present application does not limit the above "resource interface corresponding to the resource object". For example, if the resource object is a card (e.g., a card 902 shown in FIG. 9), the resource interface corresponding to the resource object may be an information detail page (e.g., the page 501 shown in FIG. 5 or a page 1001 shown in FIG. 10) linked by the card. For another example, if the resource object is a resource link (e.g., a song link), the resource interface corresponding to the resource object can be a page used by resource data (e.g., audio data) linked by the resource link.

The embodiment of the present application does not limit the presentation of the above "resource interface corresponding to the resource object", for example, it may specifically be: leaving the live streaming page, and opening a resource interface corresponding to the resource object for presentation.

For another example, in order to further improve the video viewing experience of the user, the embodiment of the present application further provides another possible implementation of the presentation of the above "resource interface corresponding to the resource object", for example, it may specifically be: presenting the resource interface corresponding to the resource object on the live streaming page, so that a viewer of the video playing page (for example, the page 1000 shown in FIG. 10) can view the resource interface corresponding to the resource object without leaving the live streaming page, thereby knowing the related information of the resource object while receiving the video data played by the video playing page, enriching the amount of information presentation, improving the efficiency of acquiring information by the user, and further improving the user experience.

It should be noted that, the embodiment of the present application does not limit the presentation of the above "resource interface corresponding to the resource object" on the live streaming page, for example, it may be made using a drop-down page (for example, the presentation of the page 1001 shown in FIG. 10) occupying the live streaming page according to a preset ratio (for example, 1/2).

It should be further noted that the embodiment of the present application does not limit an execution subject of the above S7 or S8, and for example, it may be the "electronic device of the target user". As another example, it may be an electronic device of another person (e.g., another viewer or anchor, etc.) than the target user in the live room.

Based on the related content of S7-S8, for an electronic device of any user (for example, an anchor or a viewer) in the live room, when a resource object or a resource identifier corresponding to a resource object has already been presented in the information presentation region of the live streaming page presented by the electronic device, if the electronic device detects that the user triggers a click operation on the resource object or the resource identifier corresponding to the resource object, the electronic device may present the resource interface corresponding to the resource object to the user, so that the user can browse or use the related information of the resource object.

Based on the related content of the information presentation method, the information presentation method provided by the embodiment of the application has at least the following advantages:

Advantage 1: for other information (such as sticker, recommended card, available resource data and the like) than characters, the information can be directly presented on the live streaming page by virtue of its association with certain target characters, so as to be selected by a viewer of the live streaming page, so that the operation complexity of acquiring the information can be effectively reduced, and the acquisition efficiency of the information can be improved.

Advantage 2: associated content associated with some target characters may be any kind of information (for example, sticker, card, available resource data, colored eggs corresponding to some live rooms, and the like), so that the diversity of the information posted by the user for the live streaming page is improved, and the user viewing experience of the live streaming page is improved.

Advantage 3: in some embodiments, some target characters (for example, the character string "2022" shown in FIG. 3) and associated content (for example, the object 301 shown in FIG. 3) associated with the target characters may be customized based on personalized requirements of the live room, so that the target characters and the associated content can better meet customized requirements of the live room, which is beneficial to improving interaction effects of the live room.

Advantage 4: some target characters and the associated content thereof can be composed into one comment to be posted, so that the comment posting requirements of different users can be better met, and the comment posting experience of the users can be improved.

Figure 11:
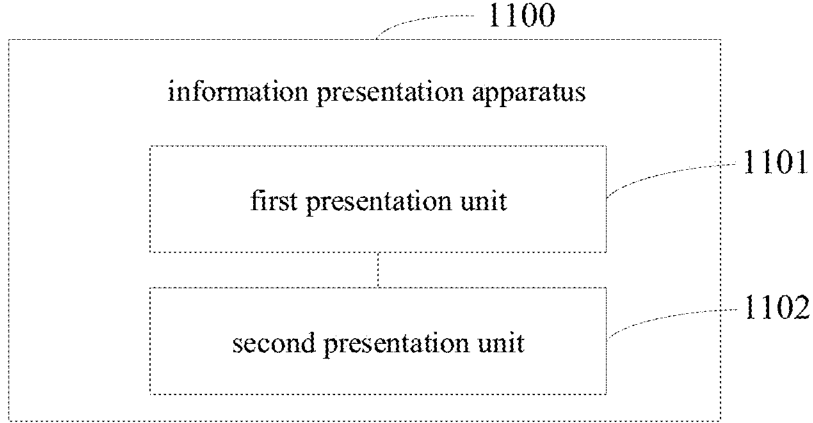
FIG. 11 is a schematic structural diagram of an information presentation apparatus according to an embodiment of the present application.

Based on the related content of the information presentation method, an embodiment of the present application further provides an information presentation apparatus, which is explained and described below with reference to FIG. 11. FIG. 11 is a schematic structural diagram of an information presentation apparatus according to an embodiment of the present application. It should be noted that, please refer to the related content of the information presentation method for technical details of the information presentation apparatus according to the embodiment of the present application.

As shown in FIG. 11, an information presentation apparatus 1100 according to the embodiment of the present application comprises:

a first presentation unit 1101, configured to present a live streaming page; the live streaming page comprising an information input region;

a second presentation unit 1102, configured to, in response to inputting information to be posted into the information input region, present, on the live streaming page, an associated object of information to be matched; wherein, a matching result between the information to be posted and the information to be matched satisfies a preset matching condition.

In a possible implementation, the associated object comprises at least one of a sticker to be used or a resource to be used.

In a possible implementation, the second presentation unit 1102 is specifically configured to:

present the associated object of the information to be matched in the information input region.

In a possible implementation, a preset position condition is satisfied between a position of the information to be posted in the information input region and a presentation position of the associated object in the information input region.

In a possible implementation, the information to be posted is located at a first end of the information input region; the associated object is presented at a second end of the information input region.

In a possible implementation, the information presentation apparatus 1100 further comprises:

an object inputting unit configured to, in response to a trigger operation on the associated object, input the associated object into the information input region.

In a possible implementation, the associated object comprises at least one candidate content;

the object inputting unit is specifically configured to: in response to a selection operation triggered on content to be used in the at least one candidate content, input the content to be used into the information input region.

In a possible implementation, the live streaming page further comprises an information posting control;

the information presentation apparatus 1100 further comprises: a first posting unit, configured to, in response to a trigger operation on the information posting control, post the information to be posted and the associated object;

In a possible implementation, the live streaming page further comprises an information posting control;

the information presentation apparatus 1100 further comprises: a second posting unit, configured to, in response to a trigger operation on the information posting control, post a composite image; the composite image being composed of the information to be posted and the associated object.

In a possible implementation, the associated object is a resource object;

the information presentation apparatus 1100 further comprises: a third presentation unit, configured to, after posting the associated object, present the resource object in an information presentation region of the live streaming page, and in response to a trigger operation on the resource object, present a resource interface corresponding to the resource object;

or, a fourth presentation unit, configured to, after posting the associated object, present a resource identifier corresponding to the resource object in an information presentation region of the live streaming page, and in response to a trigger operation on the resource identifier, present a resource interface corresponding to the resource object.

In a possible implementation, the information presentation region is a common screen.

In a possible implementation, the third presentation unit is specifically configured to:

after posting the associated object, present the resource object in an information presentation region of the live streaming page, and in response to a trigger operation on the resource object, present a resource interface corresponding to the resource object on the live streaming page;

or, the fourth presentation unit is specifically configured to, after posting the associated object, present a resource identifier corresponding to the resource object in an information presentation region of the live streaming page, and in response to a trigger operation on the resource identifier, present a resource interface corresponding to the resource object on the live streaming page.

In a possible implementation, the information presentation apparatus 1100 further comprises:

a first deleting unit, configured to, if a presentation duration of the associated object on the live streaming page reaches a preset duration threshold, canceling presenting the associated object from the live streaming page;

In a possible implementation, the information presentation apparatus 1100 further comprises:

a second deleting unit, configured to, in response to a character input operation triggered on the information input region, cancel presenting the associated object from the live streaming page.

In a possible implementation, the information to be matched is associated with at least one candidate content;

the associated object is randomly selected from the at least one candidate content, or, the associated object is the at least one candidate content.

In a possible implementation, the information to be matched and the associated object of the information to be matched are determined according to live associated information of the live streaming page.

In a possible implementation, the information input region is a comment input box.

Based on the related content of the information presentation apparatus 1100, as for the information presentation apparatus 1100 according to the embodiment of the present application, the information presentation apparatus 1100 can present a live streaming page (e.g., the live streaming page) to a target user, and after the target user inputs information to be posted into an information input region in the live streaming page, if a matching result between the information to be posted and preset information to be matched satisfies a preset matching condition, an associated object (e.g., a sticker image) of the information to be matched is presented on the live streaming page, so that the target user can directly see the associated object from the live streaming page, thereby effectively simplifying the interactive operation, so that the target user can directly see the associated object from the live streaming page with as few operations as possible, therefore, the operation complexity of the target user for acquiring the associated object can be effectively reduced, and the acquisition efficiency of the target user for the associated object can be effectively improved, and the user experience (especially, the experience for acquiring and posting other information than characters) is improved.

In addition, an embodiment of the present application further provides an electronic device, comprising a processor and a memory: the memory configured to store instructions or a computer program; the processor configured to execute the instructions or computer program in the memory, so that the electronic device performs any implementation of the information presentation method according to the embodiment of the present application.

Figure 12:
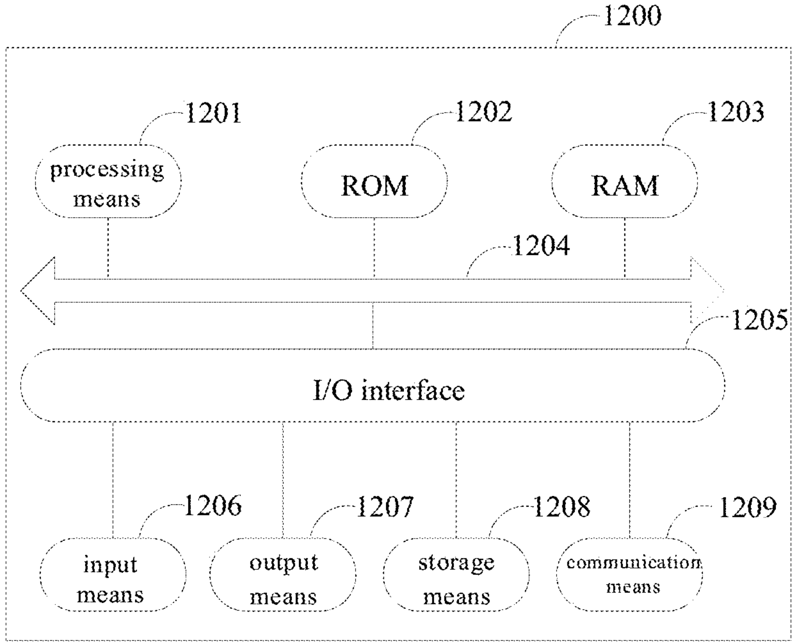
FIG. 12 is a schematic structural diagram of an electronic device according to an embodiment of the present application.

Referring to FIG. 12, it shows a schematic structural diagram of an electronic device 1200 suitable for implementing the embodiment of the present disclosure. The terminal device in the embodiment of the present disclosure may include, but is not limited to, a mobile terminal such as a mobile phone, a notebook computer, a digital broadcast receiver, a PDA (Personal Digital Assistant), a PAD (tablet computer), a PMP (Portable Multimedia Player), and a vehicle-mounted terminal (e.g., a vehicle-mounted navigation terminal), and a fixed terminal such as a digital TV, and a desktop computer. The electronic device shown in FIG. 12 is only an example, and should not bring any limitation to the functions and the usage range of the embodiment of the present disclosure.

As shown in FIG. 12, the electronic device 1200 may comprise a processing means (e.g., a central processing unit, a graphics processing unit, etc.) 1201 that may perform various appropriate actions and processes according to a program stored in a read-only memory (ROM) 1202 or a program loaded from a storage means 1208 into a random access memory (RAM) 1203. In the RAM 1203, various programs and data required for the operation of the electronic device 1200 are also stored. The processing means 1201, ROM 1202, and RAM 1203 are connected to each other via a bus 1204. An input/output (I/O) interface 1205 is also connected to the bus 1204.

Generally, the following means may be connected to the I/O interface 1205: an input means 1206 including, for example, a touch screen, touch pad, keyboard, mouse, camera, microphone, accelerometer, gyroscope, etc.; an output means 1207 including, for example, a liquid crystal display (LCD), speaker, vibrator, etc.; the storage means 1208 including, for example, a magnetic tape, hard disk, etc.; and a communication means 1209. The communication means 1209 may allow the electronic device 1200 to communicate with other devices wirelessly or by wire to exchange data. While FIG. 12 illustrates an electronic device 1200 having various means, it should be understood that not all illustrated means are required to be implemented or provided. More or fewer means may be alternatively implemented or provided.

In particular, according to an embodiment of the present disclosure, the above processes described with reference to the flow diagrams may be implemented as a computer software program. For example, an embodiment of the present disclosure includes a computer program product comprising a computer program carried on a non-transitory computer-readable medium, the computer program containing program code for performing the method illustrated by the flow diagrams. In such an embodiment, the computer program may be downloaded and installed from a network through the communication means 1209, or installed from the storage means 1208, or installed from the ROM 1202. The computer program, when executed by the processing means 1201, performs the above functions defined in the method of the embodiment of the present disclosure.

The electronic device provided by the embodiment of the present disclosure and the method provided by the above embodiment belong to the same inventive concept, and for technical details that are not described in detail in this embodiment, reference can be made to the above embodiment, and this embodiment has the same beneficial effects as the above embodiment.

An embodiment of the present application further provides a computer-readable medium having therein stored instructions or a computer program which, when run on a device, cause the device to execute any implementation of the information presentation method according to the embodiment of the present application.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may include a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

In some implementations, a client and a server may communicate using any currently known or future developed network protocol, such as HTTP (Hyper Text Transfer Protocol), and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be contained in the above electronic device; or may exist separately without being assembled into the electronic device.

The above computer-readable medium has one or more programs carried thereon, wherein the above one or more programs, when executed by the electronic device, cause the electronic device to perform the above method.

Computer program code for performing the operation of the present disclosure may be written in one or more programming languages or a combination thereof, wherein the above programming language includes but is not limited to an object-oriented programming language such as Java, Smalltalk, and C++, and also includes a conventional procedural programming language, such as a "C" language or a similar programming language. The program code may be executed entirely on a user's computer, partly on a user's computer, as a stand-alone software package, partly on a user's computer and partly on a remote computer, or entirely on a remote computer or server. In a scenario where a remote computer is involved, the remote computer may be connected to a user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which includes one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or they may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or by a combination of special-purpose hardware and computer instructions.

The involved units described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, a hardware logic component of an exemplary type that may be used includes: a field programmable gate array (FPGA), an application specific integrated circuit (ASIC), an application specific standard parts (ASSP), a system on chip (SOC), a complex programmable logic device (CPLD), and the like.

In the context of this disclosure, a machine-readable medium may be a tangible medium, which can contain or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

It should be noted that, in this description, the embodiments are described in a progressive manner, and each embodiment focuses on differences from other embodiments, so that for same and similar parts among the embodiments, reference may be made to each other. For the system or the apparatus disclosed by the embodiment, the description is simple since it corresponds to the method disclosed by the embodiment, so that reference can be made to the description of the method for the relevant points.

It should be understood that, in the present application, "at least one" refers to one or more, "a plurality" refers to two or more. "and/or", which is used for describing an association between associated objects, indicates that there may be three relationships, for example, "A and/or B" may represent three cases: the presence of A alone, the presence of B alone, and the presence of A and B simultaneously, wherein A and B may be singular or plural. A character "/" generally indicates that preceding and succeeding objects associated are in an "or" relationship. "At least one of the following items" or its similar expression refers to any combination of these items, including any combination of the singular or plural items. For example, at least one of a, b, or c, may represent: a, b, c, "a and b", "a and c", "b and c", or "a and b and c", where a, b and c may be single or plural.

It should also be noted that, relational terms such as "first" and "second", herein, are only used for distinguishing one entity or operation from another entity or operation without necessarily requiring or implying any such actual relation or order between these entities or operations. Moreover, the term "comprise", "include", or any other variation thereof, is intended to encompass a non-exclusive inclusion, such that a process, method, article, or device comprising a list of elements not only includes those elements but also includes other elements not expressly listed, or also includes elements inherent to such a process, method, article, or device. Without more limitations, an element defined by a statement "comprising a . . . " does not exclude the presence of another identical element in a process, method, article, or device that includes the element.

The steps of the method or algorithm described in conjunction with the embodiments disclosed herein may be implemented by directly using hardware, a software module executed by a processor, or a combination of the two. The software module may be provided in a random access memory (RAM), memory, read-only memory (ROM), electrically programmable ROM, electrically erasable programmable ROM, register, hard disk, removable disk, CD-ROM, or any other form of storage medium known in the art.

The above description of the disclosed embodiments enables those skilled in the art to implement or use the present application. Various modifications to these embodiments will be readily apparent to those skilled in the art, and the general principles defined herein may be implemented in other embodiments without departing from the spirit or scope of the present application. Therefore, the present application is not intended to be limited to these embodiments shown herein but to conform to the widest scope consistent with the principles and novel features disclosed herein.

What is claimed is:

1. An information presentation method, comprising:

presenting a live streaming page; the live streaming page comprising an information input region which is a comment input box;

in response to inputting information to be posted into the information input region, presenting, on the live streaming page, an associated object of information to be matched;

wherein, the associated object is a resource object, and a matching result between the information to be posted and the information to be matched satisfies a preset matching condition;

in response to a trigger operation on the associated object, inputting the associated object into the information input region; and after posting a comment corresponding to the associated object, presenting a comment corresponding to the resource object in an information presentation region of the live streaming page, and in response to a trigger operation on the comment corresponding to the resource object, presenting a resource interface corresponding to the resource object.

2. The method according to claim 1, wherein, the associated object comprises at least one of a sticker to be used or a resource to be used.

3. The method according to claim 1, wherein, the presenting, on the live streaming page, an associated object of information to be matched, comprises:

presenting the associated object of the information to be matched in the information input region.

4. The method according to claim 3, wherein, a preset position condition is satisfied between a position of the information to be posted in the information input region and a presentation position of the associated object in the information input region.

5. The method according to claim 4, wherein, the information to be posted is located at a first end of the information input region; the associated object is presented at a second end of the information input region.

6. The method according to claim 1, wherein, the associated object comprises at least one candidate content;

in response to the trigger operation on the associated object, inputting the associated object into the information input region, comprises:

in response to a selection operation triggered on content to be used in the at least one candidate content, inputting the content to be used into the information input region.

7. The method according to claim 1, wherein, the live streaming page further comprises an information posting control;

after the inputting the associated object into the information input region, the method further comprises:

in response to a trigger operation on the information posting control, posting the information to be posted and the associated object;

or, after the inputting the associated object into the information input region, the method further comprises:

in response to a trigger operation on the information posting control, posting a composite image; the composite image being composed of the information to be posted and the associated object.

8. The method according to claim 1, wherein, the presenting a comment corresponding to the resource object in an information presentation region of the live streaming page, and in response to a trigger operation on the comment corresponding to the resource object, presenting a resource interface corresponding to the resource object comprises one of the following:

presenting the resource object in the information presentation region of the live streaming page, and in response to a trigger operation on the resource object, presenting the resource interface corresponding to the resource object;

or, presenting a resource identifier corresponding to the resource object in the information presentation region of the live streaming page, and in response to a trigger operation on the resource identifier, presenting the resource interface corresponding to the resource object.

9. The method according to claim 8, wherein, the presenting the resource interface corresponding to the resource object, comprises:

presenting the resource interface corresponding to the resource object on the live streaming page.

10. The method according to claim 1, wherein, after the presenting, on the live streaming page, an associated object of information to be matched, the method further comprises:

in response to a presentation duration of the associated object on the live streaming page reaching a preset duration threshold, canceling presenting the associated object from the live streaming page;

or, in response to a character input operation triggered on the information input region, canceling presenting the associated object from the live streaming page.

11. The method according to claim 1, wherein, the information to be matched is associated with at least one candidate content;

the associated object is randomly selected from the at least one candidate content, or, the associated object is the at least one candidate content.

12. The method according to claim 1, wherein, the information to be matched and the associated object of the information to be matched are determined according to live associated information of the live streaming page.

13. An electronic device, comprising: a processor and a memory;

the memory configured to store instructions or a computer program;

the processor configured to execute the instructions or computer program in the memory, so that the electronic device performs the operations comprising:

presenting a live streaming page; the live streaming page comprising an information input region which is a comment input box;

in response to inputting information to be posted into the information input region, presenting, on the live streaming page, an associated object of information to be matched; wherein, the associated object is a resource object, and a matching result between the information to be posted and the information to be matched satisfies a preset matching condition; and after posting a comment corresponding to the associated object, presenting a comment corresponding to the resource object in an information presentation region of the live streaming page, and in response to a trigger operation on the comment corresponding to the resource object, presenting a resource interface corresponding to the resource object.

14. The electronic device according to claim 13, wherein, the associated object comprises at least one of a sticker to be used or a resource to be used.

15. The electronic device according to claim 13, wherein, the presenting, on the live streaming page, an associated object of information to be matched, comprises:

presenting the associated object of the information to be matched in the information input region.

16. A non-transitory computer readable medium having instructions or a computer program stored therein, which when run on a device, causes the device to perform the operations comprising:

presenting a live streaming page; the live streaming page comprising an information input region which is a comment input box;

in response to inputting information to be posted into the information input region, presenting, on the live streaming page, an associated object of information to be matched;

wherein, the associated object is a resource object, and a matching result between the information to be posted and the information to be matched satisfies a preset matching condition; and after posting a comment corresponding to the associated object, presenting a comment corresponding to the resource object in an information presentation region of the live streaming page, and in response to a trigger operation on the comment corresponding to the resource object, presenting a resource interface corresponding to the resource object.

17. The non-transitory computer readable medium according to claim 16, wherein, the associated object comprises at least one of a sticker to be used or a resource to be used.

18. The non-transitory computer readable medium according to claim 16, wherein, the presenting, on the live streaming page, an associated object of information to be matched, comprises:

presenting the associated object of the information to be matched in the information input region.

* * * * *